United States Patent [19]

Frei et al.

[11] 4,251,706

[45] Feb. 17, 1981

[54] ELECTRODE TOOL FOR EDM AND METHOD FOR UTILIZING SUCH ELECTRODE TOOL

[75] Inventors: Charles Frei; Jean Pfau, both of Geneva, Switzerland

[73] Assignee: Ateliers des Charmilles, S.A., Geneva, Switzerland

[21] Appl. No.: 40,679

[22] Filed: May 21, 1979

[30] Foreign Application Priority Data

Jun. 1, 1978 [CH] Switzerland .................. 5998/78

[51] Int. Cl.$^3$ .................................................. B23P 1/16
[52] U.S. Cl. .................................................. 219/69 D
[58] Field of Search ................ 219/69 D, 69 M, 69 R

[56] References Cited

U.S. PATENT DOCUMENTS

| 3,061,708 | 10/1962 | Pfau | 219/69 D |
| 3,553,415 | 1/1971 | Girard | 219/69 D |
| 3,851,135 | 11/1974 | Moracz et al. | 219/69 D X |
| 4,005,304 | 1/1977 | Stayner | 219/69 D |

Primary Examiner—B. A. Reynolds
Assistant Examiner—D. A. Tone
Attorney, Agent, or Firm—Hauke and Patalidis

[57] ABSTRACT

A method for machining materials difficult to cut by EDM conventional processes and consisting in providing contamination of the machining or dielectric fluid used in the course of electrical discharge machining with particles of a metal or metallic alloy of low vaporization temperature selected, for example, from the group consisting of zinc, cadmium, tin, lead, antimony and bismuth. The contamination particles are obtained directly from a surface coating placed directly on the electrode tool or from an additional piece of metal or metallic alloy which is electro-eroded at the same time as a cut is effected by the electrode tool in an electrode workpiece, and the contaminated fluid is circulated in the machining zone between the electrodes, the contaminated fluid facilitating the triggering of the electrical discharges in the machining zone and providing an increase of the machining rate, or material removal rate.

12 Claims, 5 Drawing Figures

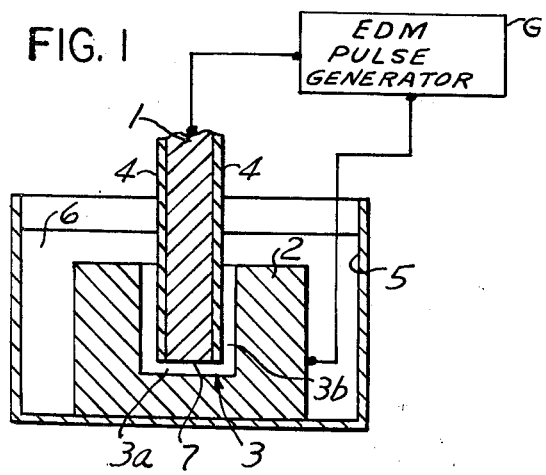
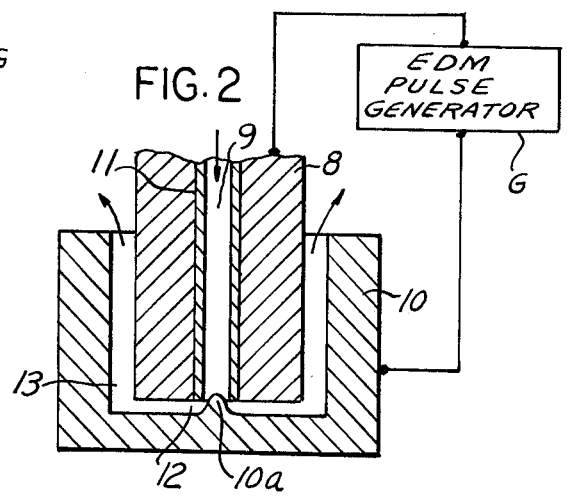
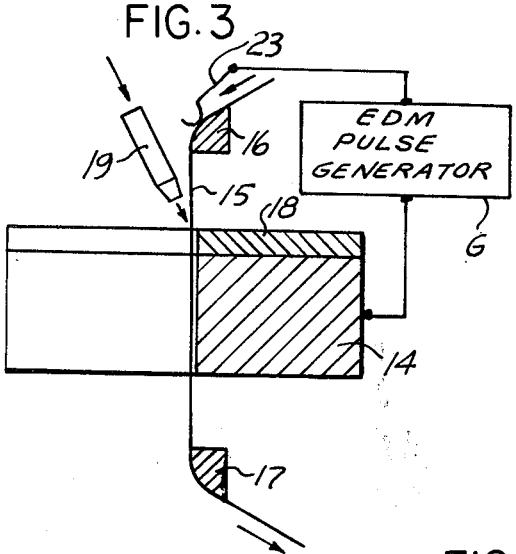
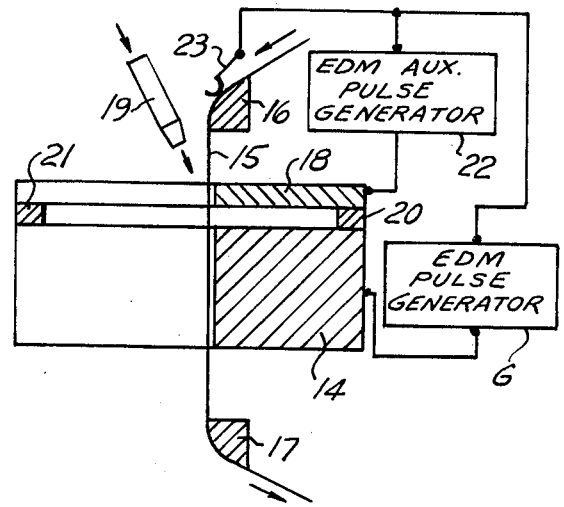
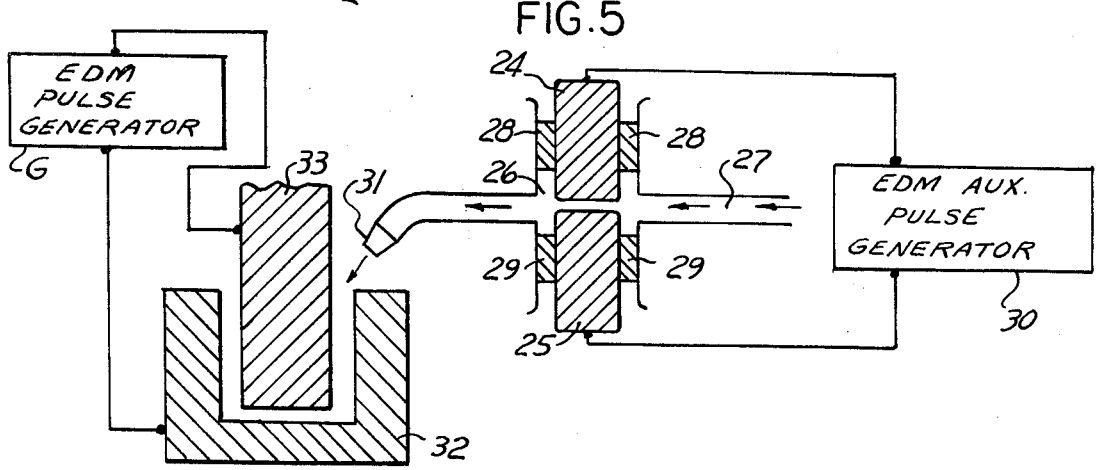

ELECTRODE TOOL FOR EDM AND METHOD FOR UTILIZING SUCH ELECTRODE TOOL

BACKGROUND OF THE INVENTION

The invention relates to a process and to a particular arrangement of elements for electrical discharge machining an electrode workpiece by way of an electrode tool.

The metal or metal alloys of which the active surface coating of an electrode tool is made has an important effect upon the machining efficiency of an EDM apparatus and the rate of wear of the electrode tool. It has been discovered that some metals having a low vaporization temperature, that is being relatively easy to electro-erode by EDM, are provided with the particular property of facilitating the triggering of electrical discharges, apparently in view of the fact that such metals load the dielectric machining fluid with particles of very small dimensions which play an important part in ionizing the machining fluid and triggering the electrical discharges in the machining gap between the electrode tool and the electrode workpiece.

Due to the presence of such metallic particles in suspension in the machining fluid, machining is effected under improved stability as soon as the electrical discharges are triggered, and it is possible to increase the gap between the electrodes, which in turn results in improving the cooling of the electrode surfaces at the machining zone, and thus in increasing the machining, or material removal, rate.

SUMMARY

The method of the invention has for its principal object taking advantage of the peculiar property of specific metals which have a high susceptibility to electro-erosion, in order to improve the machining rate of metals or alloys having poor electro-erosion qualities. The method of the invention consists essentially in introducing into the machining zone between the electrode tool and the electrode workpiece a machining fluid contaminated as a result of an auxiliary EDM operation being effected on a metallic surface comprising a metal or an alloy having a low vaporization temperature.

A further advantage of the present invention is to obtain a substantial decrease of the number of short-circuited electrical discharges, due to the fact that the metallic bridges formed between the electrodes, which cause short-circuits, are destroyed by melting resulting from affording a path through the metallic bridges for the high intensity machining current.

BRIEF DESCRIPTION OF THE DRAWING

The many objects and advantages of the present invention will become apparent to those skilled in the art when the following description of the best modes contemplated for practicing the invention is read in conjunction with the attached drawing showing, for illustrative purpose and not in a limiting sense, examples of embodiments for practicing the invention, and wherein:

FIG. 1 schematically illustrates an example of the invention as applied to a cavity sinking or trepanning electrode tool;

FIG. 2 schematically illustrates another example of cavity sinking or trepanning electrode tool;

FIG. 3 illustrates an example of application for cutting an electrode workpiece by means of a wire electrode tool;

FIG. 4 illustrates a modification of the arrangement of FIG. 3; and

FIG. 5 schematically illustrates a further modification of the invention.

DETAILED DESCRIPTION OF THE PREFERRED EMBODIMENTS

Referring to FIG. 1 of the drawing, there is illustrated, in a schematic manner, an electrode tool 1 for sinking a cavity in an electrode workpiece 2 by way of electro-erosive discharges occurring across a machining zone 3 between the electrodes 1 and 2. The pulse generator circuit G for producing the electrical discharges across the machining zone 3 is not illustrated in detail, as it forms no part of the invention and may consist of any of the EDM pulse generators well known in the art.

The peripheral surface of the electrode tool 1 is provided with a coating 4 of a metal or metallic alloy having a low vaporization temperature. The electrodes 1 and 2 are disposed in a tank 5 filled with a machining dielectric fluid 6, as is also well known in the art.

With the arrangement of FIG. 1, when the electrode tool 1 is fed into the workpiece 2 and the pulse generator G is turned on, electrical discharges occur principally across the portion 3a of the machining zone 3 in the space or gap between the frontal face 7 of the electrode tool 1 and the bottom of the cavity being machined in the workpiece 2. In addition to the electrical discharges occurring principally through the portion 3a of the machining zone 3, auxiliary discharges occur across a lateral portion 3b of the machining zone between the surface of the coating 4 on the electrode tool 1 and the lateral inner surface of the cavity being machined in the electrode workpiece 2. It is known that, in an EDM machining operation, both the electrode tool and the electrode workpiece are subject to wear due to electro-erosion, although the wear rate of the electrode tool is less than the wear rate of the electrode workpiece. Due to the close proximity between the frontal portion 3a and the lateral portion 3b of the machining zone 3, metallic particles which are broken away from the metallic coating 4 of the electrode tool 1 circulate through the frontal portion 3a of the machining zone 3 between the face 7 of the electrode tool 1 and the bottom surface of the cavity in the workpiece 2, with the remarkable result that sinking the electrode tool 1 into the workpiece 2 is greatly improved.

FIG. 2 illustrates a cavity sinking or trepanning electrode tool 8 provided with a centrally disposed passageway 9 for feeding dielectric machining fluid directly to the frontal machining zone between the face of the electrode tool 8 and the bottom of the cavity being sunk in an electrode workpiece 10, the arrows representing the direction of flow of the machining fluid. It is known that when an electrode tool provided with a machining fluid outlet at its active surface, such as the electrode tool 8, is used for sinking a cavity or trepanning a workpiece, a protuberance or projection, such as the protuberance 10a is formed on the bottom surface of the cavity, corresponding to the fluid outlet. The present invention takes advantage of the formation of such a protuberance 10a and, by providing the wall of the machining fluid passageway 9 with a metallic coating 11 of low temperature vaporization metals or alloy, the result is that, when the electrode tool 8 is advanced toward the bottom of the cavity in the workpiece 10, a fraction of the electrical discharges occurs at random between the face of the electrode tool 8 and the bottom surface of the cavity in the workpiece 10 across the frontal machining zone 12, a fraction of the electrical discharges occurs more particularly between portion of the protuberance 10a being formed on the bottom surface of the cavity projecting slightly within the bottom outlet of the channelway 9 where the gap between the metallic coating 11 and the surface of the workpiece is narrowest. The metallic particles which become detached from the surface of the coating 11 are thus caused to circulate through the frontal machining zone 12 and subsequently through the lateral machining zone 13 between the outer wall of the electrode tool 8 and the inner wall of the cavity of the workpiece 10.

FIG. 3 schematically represents a workpiece 14 in which a cut is effected by means of an electrode tool 15 in the form of a wire guided and stretched between a pair of spaced-apart support and guide members 16 and 17. A metallic plate 18, which is made of a metal or a metallic alloy susceptible of being easily cut by EDM, is mounted on the top of the workpiece 14 such as to be subjected to machining electrical discharges and be cut at the same time as the workpiece 14. The machining fluid is introduced in the gap between both the plate 18 and the workpiece 14 and the electrode wire 15 by means of a nozzle 19 such that the machining fluid is introduced first into the auxiliary machining zone between the plate 18 and the electrode wire 15 and, from there, through the main machining zone between the workpiece 14 and the electrode wire 15.

It will be appreciated that, instead of using a separate plate 18 disposed on the surface of the workpiece 14, the workpiece 14 can be provided with a coating of the appropriate metal, or metal alloy, deposited on one or both surfaces of the workpiece.

In the arrangement of elements illustrated schematically at FIG. 4, the auxiliary metallic plate 18 is mounted spaced apart from the upper surface of the workpiece 14 by means of spacers 20 and 21 made of electrically insulating material. The auxiliary electrical discharge machining of the plate 18 is effected by means of an auxiliary EDM pulse generator 22 connected across the plate 18 and a sliding contact 23 in engagement with the electrode wire 15. As in the arrangement of FIG. 3, the machining fluid is introduced by a nozzle 19 through the auxiliary machining zone between the plate 18 and the electrode wire 15, the machining fluid flowing subsequently through the machining zone between the electrode wire 15 and the workpiece 14, the EDM pulse generator G being connected in a conventional manner, across the electrode wire 15, through the sliding contact 23 and the workpiece 14.

As illustrated schematically at FIG. 5, the auxiliary electrical discharge machining providing particles of a metal or alloy having a low vaporization temperature can be effected between a pair of auxiliary electrodes 24 and 25. The auxiliary electrodes 24 and 25 are disposed facing each other in a chamber 26 through which is circulated the machining fluid under pressure prior to being introduced into the machining zone between the electrode tool and the electrode workpiece by means of a conduit 27. Insulating gaskets 28 and 29 prevent leakage of pressurized machining fluid from the chamber 26, while permitting the electrodes 24 and 25 to be fed toward each other by any appropriate means, not shown, to maintain an appropriate narrow gap between the electrode faces, and such as to compensate for wear. The electrodes 24 and 25 are connected across an auxiliary EDM pulse generator 30. The machining fluid contaminated by the metallic particles removed from the faces of the auxiliary electrodes 24 and 25 is injected by means of a nozzle 31 into the machining zone in the gap between a workpiece 32, made of a material difficult to machine by EDM, and an electrode tool 33 preferably made of a material having a low wear ratio.

In all the examples of applications of the invention which have been disclosed, auxiliary EDM machining is effected on a member made of a metal or metal alloy having a low vaporization temperature, or by means of an electrode tool having a surface provided with such a metal or alloy. Preferably, the auxiliary metallic member, or electrode tool coating, comprises at least 50% of one metal or of an alloy of metals selected from the group consisting of zinc, cadmium, tin, lead, antimony and bismuth.

In every example of applications of the present invention disclosed and illustrated, the auxiliary EDM machining is effected proximate the main or principal machining zone in the gap between the electrode and a machined surface of the workpiece. It will be appreciated however that such an arrangement is not absolutely necessary and that the contaminated machining fluid obtained by the auxiliary EDM operation could be obtained by drawing contaminated machining fluid from another EDM apparatus or even by contaminating the supply of machining fluid of a given EDM apparatus by effecting a prior machining operation on a workpiece made of a metal or an alloy of metals having a low vaporization temperature coefficient, the contaminated fluid being carefully stored and reused at a later time for effecting a cut in or shaping of, a workpiece difficult to machine other than under the favorable conditions resulting from utilizing contaminated fluid obtained under controlled conditions.

Having thus described the present invention by way of examples of typical applications thereof, modifications whereof will be apparent to those skilled in the art, what is claimed as new is as follows:

1. A method for EDM machining an electrode workpiece by means of an electrode tool, said method comprising introducing into the machining zone between said electrodes an EDM machining fluid contaminated as a result of having been used previously for machining an element containing at least one metal having a low vaporization coefficient.

2. The method of claim 1 wherein said metal is selected from the group consisting of zinc, cadmium, tin, lead, antimony, bismuth, and alloys and mixtures thereof.

3. The method of claim 1 wherein said element contains at least 50% by weight of said metal.

4. In an EDM apparatus for machining an electrode workpiece by means of an electrode tool wherein an EDM pulse generator is connected across said electrodes and a machining fluid is fed in a machining zone between said electrodes, the improvement comprising means for machining by electrical discharges a metallic surface comprising at least one metal having a vaporization temperature lower than the vaporization temperature of any of the metals of said electrode workpiece, and means for circulating said machining fluid successively through a first machining zone in which said metallic surface is subjected to EDM pulses and a second machining zone between said electrode tool and said electrode workpiece.

5. The improvement of claim 4 wherein said metallic surface contains at least 50% by weight of a metal selected from the group consisting of zinc, cadmium, tin, lead, antimony, bismuth, and alloys and mixtures thereof.

6. The improvement of claim 5 wherein said metallic surface is disposed at least on a machining surface of said electrode tool.

7. The improvement of claim 5 wherein said metallic surface is disposed at least on a machined portion of said electrode workpiece.

8. The improvement of claim 6 wherein said metallic surface is disposed on a lateral surface of said electrode tool.

9. The improvement of claim 6 wherein said electrode tool has a machining fluid passageway for feeding said fluid to the machining zone between said electrode tool and said electrode workpiece, and said metallic surface is disposed on the wall surface of said passageway.

10. The improvement of claim 7 wherein said metallic surface takes the form of a metallic plate disposed on a surface of said electrode workpiece such as to be cut simultaneously with the workpiece by means of an electrode wire.

11. The improvement of claim 10 wherein said metallic plate is electrically insulated from said workpiece, and said metallic plate and said electrode wire are connected across an auxiliary EDM pulse generator.

12. The improvement of claim 5 wherein said metallic surface is disposed at least on a surface of one of a pair of auxiliary electrodes, said auxiliary electrodes forming between their active surfaces a portion of a passageway supplying machining fluid to the machining zone between said electrode tool and said electrode workpiece, and further comprising an auxiliary EDM pulse generator across which said auxiliary electrodes are connected for causing electrical discharges to take place between said auxiliary electrodes.

* * * * *